(12) United States Patent
Broekhuijsen et al.

(10) Patent No.: US 11,434,874 B2
(45) Date of Patent: Sep. 6, 2022

(54) TOWER FOR A WIND TURBINE AND A WIND TURBINE

(71) Applicant: Siemens Gamesa Renewable Energy A/S, Brande (DK)

(72) Inventors: Tom Broekhuijsen, Rijswijk (NL); Jacobus Klaassen, Voorburg (NL); Cees Sombroek, Volendam (NL); Kumayl Sarwar, Amsterdam (NL)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/487,178

(22) PCT Filed: Nov. 27, 2017

(86) PCT No.: PCT/EP2017/080439
§ 371 (c)(1),
(2) Date: Aug. 20, 2019

(87) PCT Pub. No.: WO2018/153519
PCT Pub. Date: Aug. 30, 2018

(65) Prior Publication Data
US 2020/0063714 A1 Feb. 27, 2020

(30) Foreign Application Priority Data

Feb. 22, 2017 (DE) .................... 10 2017 202 875.0

(51) Int. Cl.
*E04F 19/00* (2006.01)
*F03D 13/20* (2016.01)
(Continued)

(52) U.S. Cl.
CPC ............. *F03D 13/20* (2016.05); *F03D 80/50* (2016.05); *F21S 8/024* (2013.01); *F21V 13/12* (2013.01);
(Continued)

(58) Field of Classification Search
CPC ...... F03D 13/20; F03D 80/50; F21W 2131/40
See application file for complete search history.

(56) References Cited

U.S. PATENT DOCUMENTS 1,909,404 A * 5/1933 Horn .......................... F21S 8/00
362/101
3,007,034 A * 10/1961 Reed .......................... B64F 1/20
362/153
(Continued)

FOREIGN PATENT DOCUMENTS

CN 2854320 Y 1/2007
DE 10358962 A1 7/2005
(Continued)

OTHER PUBLICATIONS

International Search Report & Written Opinion dated Mar. 20, 2018 for Application No. PCT/EP2017/080439.
(Continued)

*Primary Examiner* — Basil S Katcheves
(74) *Attorney, Agent, or Firm* — Schmeiser, Olsen & Watts LLP

(57) ABSTRACT

A tower for wind turbine is provided, including an outer wall encompassing an inner space and including a through-hole having a central axis, and a light source configured to emit light through the through-hole into an environment surrounding the tower, wherein the light source lies on the central axis of the through-hole and is arranged inside the inner space of the outer wall. The serviceability and maintenance of the light source is improved since the light source can be easily accessed by maintenance personnel operating inside the tower.

16 Claims, 3 Drawing Sheets

(51) Int. Cl.
*F03D 80/50* (2016.01)
*F21S 8/02* (2006.01)
*F21V 13/12* (2006.01)
*F21V 15/01* (2006.01)
*F21V 33/00* (2006.01)
*F21W 131/40* (2006.01)

(52) U.S. Cl.
CPC ............ *F21V 15/01* (2013.01); *F21V 33/006* (2013.01); *F21W 2131/40* (2013.01)

(56) References Cited

U.S. PATENT DOCUMENTS

| | | | | |
|---|---|---|---|---|
| 3,437,804 A * | 4/1969 | Volker | ................ | G02B 6/4298 |
| | | | | 362/551 |
| 4,151,582 A * | 4/1979 | Grunberger | ......... | G02B 6/2817 |
| | | | | 362/297 |
| 4,500,167 A * | 2/1985 | Mori | ................ | F24S 23/12 |
| | | | | 385/31 |
| 4,912,610 A * | 3/1990 | Dahlberg | ................ | B64F 1/20 |
| | | | | 362/153.1 |
| 5,249,108 A * | 9/1993 | Gary | ................ | F21V 21/14 |
| | | | | 248/231.9 |
| 5,546,712 A * | 8/1996 | Bixby | ................ | E04D 13/031 |
| | | | | 126/623 |
| 5,738,678 A * | 4/1998 | Patel | ................ | A61C 1/0046 |
| | | | | 433/215 |
| 5,878,539 A * | 3/1999 | Grubb | ................ | E04D 13/03 |
| | | | | 52/199 |
| 5,983,581 A * | 11/1999 | DeBlock | ................ | E04D 13/033 |
| | | | | 52/200 |
| 6,106,134 A * | 8/2000 | Bomas | ................ | F21S 8/083 |
| | | | | 362/153 |
| 6,176,595 B1 * | 1/2001 | Bomas | ................ | F21S 8/083 |
| | | | | 362/152 |
| 6,179,435 B1 * | 1/2001 | Wilson | ................ | F21V 19/04 |
| | | | | 362/147 |
| 6,183,112 B1 * | 2/2001 | Bomas | ................ | F21S 8/083 |
| | | | | 362/153 |
| 6,354,714 B1 * | 3/2002 | Rhodes | ................ | F21S 4/24 |
| | | | | 362/153.1 |
| 6,363,667 B2 * | 4/2002 | O'Neill | ................ | E04B 9/32 |
| | | | | 359/597 |
| 6,568,823 B1 * | 5/2003 | Fielding | ................ | G21C 17/00 |
| | | | | 362/101 |
| 7,524,078 B1 * | 4/2009 | Pressel | ................ | F21S 8/022 |
| | | | | 362/153 |
| 7,556,394 B2 * | 7/2009 | Patti | ................ | E01C 17/00 |
| | | | | 362/153.1 |
| 8,100,590 B2 * | 1/2012 | Huang | ................ | F21V 19/04 |
| | | | | 266/100 |
| 8,555,571 B2 * | 10/2013 | Darmer | ................ | E04B 9/32 |
| | | | | 52/200 |
| 9,109,775 B2 * | 8/2015 | Burt | ................ | F21V 29/503 |
| 9,648,688 B2 * | 5/2017 | Beausoleil | ................ | G08B 5/36 |
| 10,323,824 B1 * | 6/2019 | Lim | ................ | F21K 9/275 |
| 2002/0093823 A1 | 7/2002 | Rohlfing | | |
| 2002/0105432 A1 * | 8/2002 | Pederson | ................ | G09G 3/001 |
| | | | | 340/815.45 |
| 2007/0074468 A1 * | 4/2007 | Jaster | ................ | E04D 13/03 |
| | | | | 52/200 |
| 2008/0017120 A1 * | 1/2008 | Hawk | ................ | A01K 39/0213 |
| | | | | 119/72 |
| 2008/0192460 A1 * | 8/2008 | Wobben | ................ | F03D 80/10 |
| | | | | 362/145 |
| 2009/0304505 A1 * | 12/2009 | Wobben | ................ | F03D 80/40 |
| | | | | 416/1 |
| 2011/0051421 A1 * | 3/2011 | Chew | ................ | F21V 31/04 |
| | | | | 362/249.06 |
| 2012/0171036 A1 | 7/2012 | Westergaard | | |
| 2014/0252249 A1 * | 9/2014 | Doros | ................ | F21V 17/002 |
| | | | | 250/504 R |
| 2015/0229891 A1 * | 8/2015 | Komatsu | ................ | F21V 5/04 |
| | | | | 353/31 |
| 2015/0253487 A1 * | 9/2015 | Nichol | ................ | G02B 6/006 |
| | | | | 362/610 |
| 2017/0089564 A1 * | 3/2017 | Miller | ................ | F21V 15/01 |
| 2017/0284377 A1 * | 10/2017 | Schultz | ................ | F21V 5/046 |
| 2018/0080630 A1 * | 3/2018 | Wang | ................ | F21V 9/30 |
| 2018/0087729 A1 * | 3/2018 | Garvin | ................ | F21V 15/02 |
| 2019/0338914 A1 * | 11/2019 | Laakso | ................ | F21V 5/008 |

FOREIGN PATENT DOCUMENTS

| | | | |
|---|---|---|---|
| DE | 202006020571 U1 | 1/2009 | |
| DE | 202015105908 U1 | 2/2017 | |
| EP | 1544460 A2 | 6/2005 | |
| EP | 2110553 A2 | 10/2009 | |
| EP | 2213876 A1 | 8/2010 | |
| EP | 1 842 004 B1 | 8/2015 | |
| EP | 1842004 B1 | 8/2015 | |
| EP | 2924282 A1 | 9/2015 | |
| EP | 2985513 A1 | 2/2016 | |
| EP | 3006822 A1 | 4/2016 | |
| EP | 3339722 A1 * | 6/2018 | ............ F21V 5/045 |
| JP | 2002279802 A | 9/2002 | |
| JP | 2004285857 A | 10/2004 | |
| WO | 9313355 A1 | 7/1993 | |
| WO | WO9313355 A1 | 7/1993 | |

OTHER PUBLICATIONS

Non-English Chinese Office Action dated May 18, 2020 for Application No. 201780087201.1.

* cited by examiner

TOWER FOR A WIND TURBINE AND A WIND TURBINE

CROSS-REFERENCE TO RELATED APPLICATIONS

This application claims priority to PCT Application No. PCT/EP2017/080439, having a filing date of Nov. 27, 2017, which is based on German Application No. 10 2017 202 875.0, having a filing date of Feb. 22, 2017, the entire contents both of which are hereby incorporated by reference.

FIELD OF TECHNOLOGY

The following relates to a tower for a wind turbine and to a wind turbine.

BACKGROUND

Modern wind turbines typically comprise a tower supporting a nacelle located at an upper end of the tower. Further, the wind turbine comprises a rotor connected to a generator which is arranged inside the nacelle. The rotor typically comprises three rotor blades which further increase the dimensions of the wind turbine. Because of the dimensions of wind turbines flying objects, e.g. planes or helicopters, can be disturbed. Thus, wind turbines usually require means to warn approaching objects. Such requirements may be prescribed by local regulations. Such warning means include aviation and/or obstruction lights. When equipping the tower with a light it should be clearly visible from the outside while easily accessible from the inside for maintenance and service.

EP 1 842 004 B1 shows a tower of a wind turbine provided with a flash light inserted in a through-hole of an outer wall of the tower. One part of the flash light which comprises a light source protrudes out of the through-hole. The light source is arranged outside the outer wall of the tower and faces an environment surrounding the tower.

DE 103 58 962 A1 shows a tower of a wind turbine. The tower comprises an outer wall encompassing an inner space. A light source is supported at a separate platform of the tower. Further, a through-hole is provided in the outer wall above the light source. The light source is supplying several fiber optic cables with light, wherein the fiber optic cables are connected to obstruction lights located at an outer face of the outer wall of the tower.

SUMMARY

An aspect relates to an improved tower for a wind turbine and an improved wind turbine.

Accordingly, a tower for a wind turbine is provided. The tower comprises an outer wall encompassing an inner space and including a through-hole having a central axis, and a light source configured to emit light through the through-hole into an environment surrounding the tower. The light source lies on the central axis of the through-hole and is arranged inside the inner space of the outer wall.

In contrast to known towers, the serviceability and maintenance of the light source is improved since the light source can be easily accessed by maintenance personnel operating inside the tower. Further, by means of arranging the light source on the central axis of the through-hole a compact lighting arrangement with reduced failure susceptibility is provided.

In particular, the outer wall of the wind turbine constitutes a main structure supporting a nacelle and a rotor of the wind turbine. A cross-section of the outer wall has a circular ring shape. The inner space of the tower is defined by an inner shell surface of the outer wall. The through-hole has a circular shape. Alternatively, the through-hole may have a rectangular or elliptical contour. In particular, the central axis passes a center relative to the contour of the through-hole.

The "light source lies on the central axis" means that the central axis intersects the light source. The light source is thus arranged in line with and in front of the through-hole. The light emitted by the light source is guided at least partially through a volume of air or vacuum on its path from the light source towards the environment surrounding the tower. Thus, there is no need to use e.g. fiber optic cables. The light source comprises light-emitting diodes, a light bulb, a halogen lamp and/or a fluorescent lamp.

According to an embodiment the tower further comprises a housing arranged at least partially inside the through-hole, wherein the light emitted by the light source passes through the housing.

The housing may be insertable into the through-hole. The housing comprises a tube, in particular having a reflective inner surface configured to guide the light.

According to a further embodiment, the housing supports the light source at its inner end.

Further, the light source may be detachably mounted to the housing such that serviceability is simplified. Furthermore, the light source may be supported inside the inner space exclusively by means of the housing or the housing and struts, i.e. there are no other components holding or supporting the light source.

According to a further embodiment, the tower further comprises an optical element. The housing supports the optical element at its outer end. The optical element is configured to modify the light on its path into the environment.

Thus, a suitable obstruction light can be provided. The light source is associated with a single through-hole only, i.e. does not supply light to the outside through other through-holes. The optical element is a lens or a prism. The optical element protrudes into the environment past the outer wall. Thus, the optical element should be robust, highly transparent, heat dispersive, resistant against weathering and ageing effects. The optical element comprises glass, crystal and/or high-density polymer, e.g. Polymethyl Methacrylate (PMMA). The optical element may also be arranged completely inside the through-hole (without protruding into the environment).

According to an embodiment, the optical element is configured to disperse the light.

According to a further embodiment, the tower further comprises a lens arranged inside the housing in the light path from the light source towards the optical element.

Thus, adapting the characteristics of the light emitted by the light source is facilitated. The lens has a concave shape viewing form the environment surrounding the tower.

According to a further embodiment, the tower further comprises a reflective arrangement arranged between the lens and the light source, the reflective arrangement converging towards the lens.

The reflective arrangement is a reflective tube. It is understood that an inner surface of the tube is reflective. Thus, the light emitted by the light source can be focused and efficiency is increased since absorption of light is reduced.

According to a further embodiment, the housing comprises a cylindrical portion arranged at least partially inside the through-hole and a flange portion connected to the cylindrical portion and extending radially along an inner surface of the outer wall.

Thus, the through-hole is reliably covered by means of the housing and a reliable connection between the housing and the outer wall of the tower can be achieved. The flange portion is fixed to the inner surface of the outer wall by means of studs or screws.

According to a further embodiment, the tower comprises at least one strut supporting the light source, the strut being attached to the flange portion and/or the inner surface of the outer wall and to the light source.

Thus, the housing and the light source can be mounted from the inside of the tower, thus increasing the safety of personnel mounting or servicing such lighting arrangements. Several struts, e.g. 2, 3 or 4, are provided. The struts are fixed to the flange portion and/or to the inner surface of the outer wall by means of studs or screws.

According to a further embodiment, the tower further comprises a seal configured to seal the through-hole of the outer wall against the housing.

The seal comprises a first portion arranged between an inner surface of the through-hole and an outer surface of the housing, and a second portion arranged between the inner surface of the outer wall and an outer surface of the flange portion of the housing. Thus, a reliable seal can be provided.

Further, a tower for a wind turbine is provided. The tower comprises an outer wall encompassing an inner space and having a through-hole, a mirror, and a light source configured to emit light towards the mirror and arranged inside the inner space. The mirror is configured to reflect the light through the through-hole into the environment.

This has the advantage that the light source and/or the mirror can be arranged at a place having a good accessibility. Further, the through-hole can be arranged at any place of the outer wall. The use of a mirror ensures a simple light path. Further, optical fibers do not allow sharp angles. Reflecting the light in a sharp angle by means of the mirror leads to a more compact design. The "mirror" means a reflective element configured to reflect sufficient light into the environment.

Furthermore, a wind turbine comprising such a tower is provided.

"Wind turbine" presently refers to an apparatus converting the wind's kinetic energy into rotational energy, which may again be converted to electrical energy by the apparatus.

The embodiments and features described with reference to the tower—comprising the light source lying on the central axis of the through-hole—of embodiments of the present invention apply mutatis mutandis to the tower—comprising the mirror—of embodiments of the present invention.

Further possible implementations or alternative solutions of embodiments of the invention also encompass combinations that are not explicitly mentioned herein of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein.

DETAILED DESCRIPTION

Figure 1:
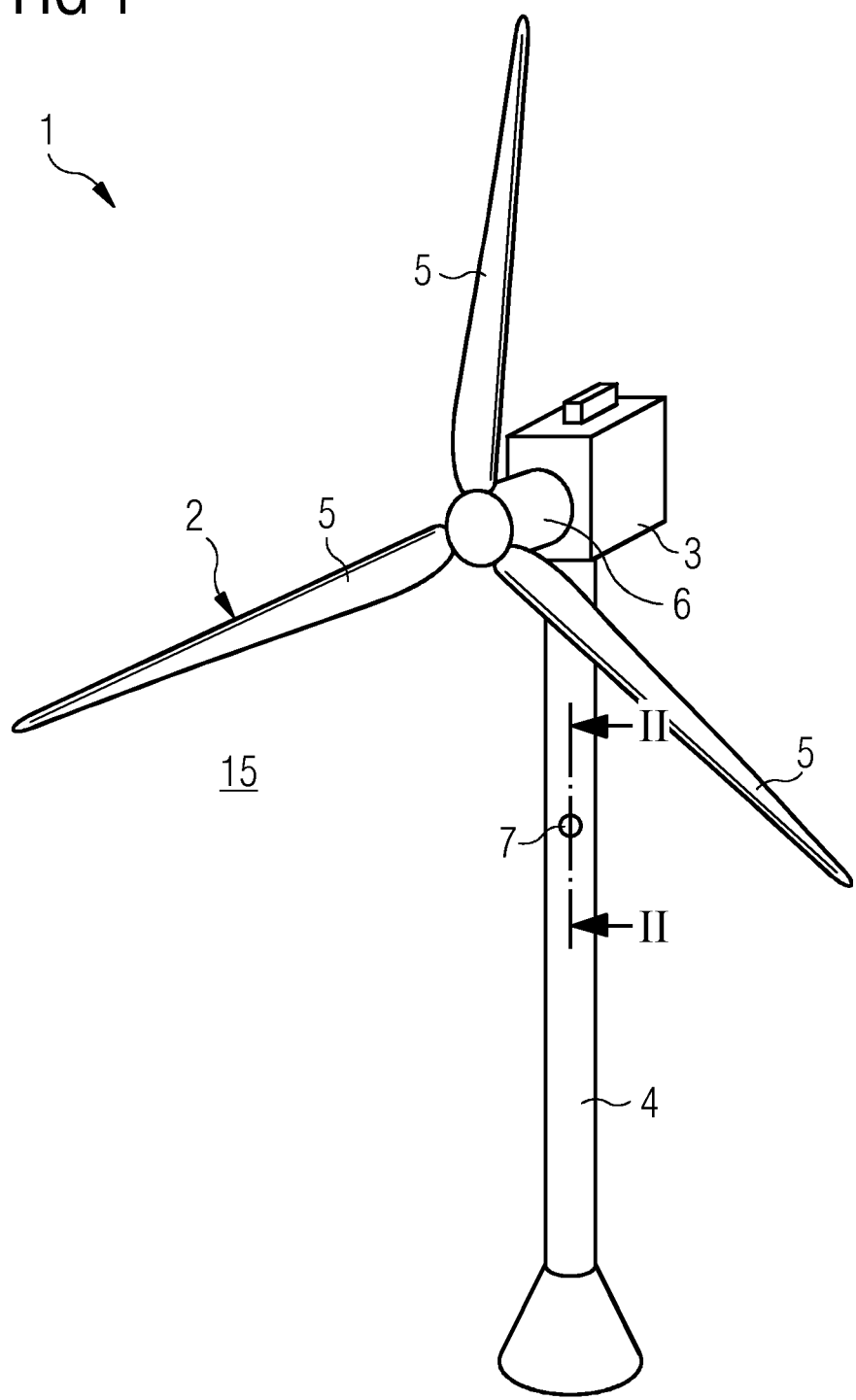
FIG. 1 shows a perspective view of a wind turbine according to an embodiment.

FIG. 1 shows a wind turbine 1 comprising a rotor 2 connected to a generator (not shown) arranged inside a nacelle 3. The nacelle 3 is arranged at the upper end of a tower 4 of the wind turbine 1.

The rotor 2 comprises three rotor blades 5. Alternatively, only two or more than three rotor blades 5 can be provided. The rotor blades 5 are connected to a hub 6 of the wind turbine 1. Rotors 2 of this kind may have diameters ranging from, for example, 30 to 200 meters or even more.

Further, the tower comprises an obstruction light 7 for warning approaching objects. The tower 4 may comprise several obstruction lights 7 arranged around a circumference of the tower and/or arranged at different heights of the tower 4.

Figure 2:
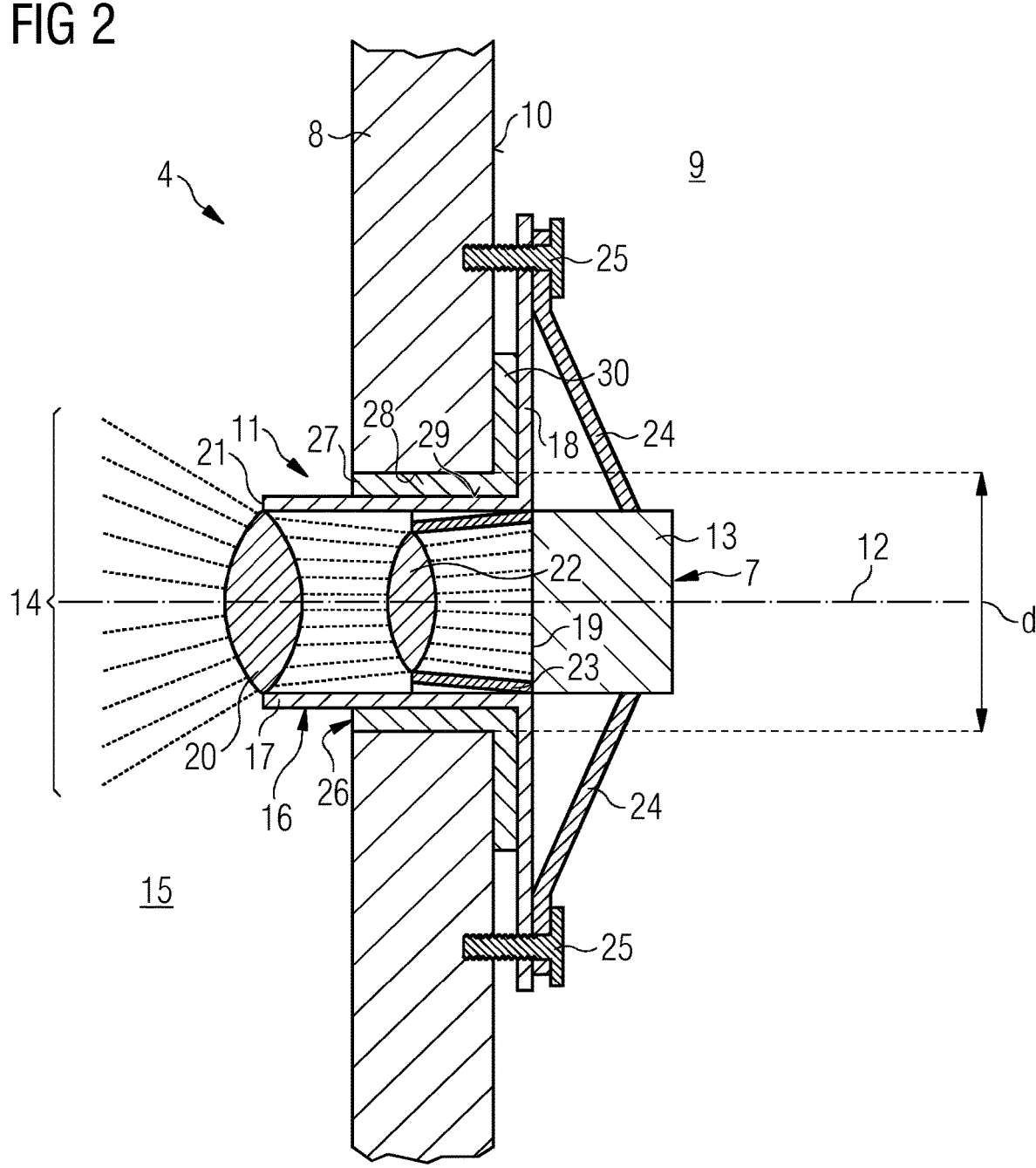
FIG. 2 shows, in a cross-sectional view II-II from FIG. 1, a first embodiment.

FIG. 2 shows a cross-sectional view II-II from FIG. 1.

The tower 4 comprises an outer wall 8 encompassing an inner space 9 by means of its inner surface 10. The outer wall 8 includes a through-hole 11 having a central axis 12. The through-hole 11 has a circular cross-section, wherein a diameter d of the through-hole 11 may vary from, for example, 20 to 60 mm or even more. The obstruction light 7 comprises a light source 13 configured to emit light 14 through the through-hole 11 into an environment 15 surrounding the tower 4. The light source 13 lies on the central axis 12 of the through-hole 11 and is arranged inside the inner space 9 of the tower 4.

The obstruction light 7 further comprises a housing 16 arranged at least partially inside the through-hole 11. The housing 16 comprises a cylindrical portion 17 (e.g. a tube) arranged at least partially inside the through-hole 11 and a flange portion 18 connected to the cylindrical portion 17 and extending radially along the inner surface 10 of the outer wall 8. The light 14 emitted by the light source 7 passes through the housing 16. The housing 16 supports the light source 13 at its inner end 19.

The obstruction light 7 further comprises an optical element 20. The housing 16 supports the optical element 20 at its outer end 21. A portion of the housing 16 including the optical element 20 may protrude past the outer wall 8 into the environment 15. The optical element 20, e.g. a lens or prism, is configured to modify the light 14 on its path into the environment 15. Further, the optical element 20 is configured to disperse the light 14. The light 14 travels freely through the through-hole 11 and is then dispersed on the outside of the tower 4.

The obstruction light 7 further comprises a lens 22, e.g. a concave lens, arranged inside the housing 16 in the light path from the light source 13 towards the optical element 20.

The obstruction light 7 further comprises a reflective tube 23 arranged between the lens 22 and the light source 13. The reflective tube 23 converges towards the lens 22. The optical element 20, the housing 16, the lens 22 and/or the tube 23 may be provided as one module which is insertable into the through-hole 11 and detachable from the through-hole 11 as one unit.

The obstruction light 7 further comprises struts 24 supporting the light source 13. The struts 24 are attached to the flange portion 18 and to the light source 13. Further, the light source 13 is mounted detachably to the housing 16, e.g. by means of bolts 25. The light source 13 may be a separate module mountable to the housing 16. Alternatively, the optical element 20, the housing 16, the lens 22, the tube 23 and/or the light source 13 may be provided as one module which is insertable in the through-hole 11 and detachable from the through-hole 11 as one unit.

Alternatively, the struts 24 may be attached to the inner surface 10 of the outer wall 8 and the light source 13 such that the light source 13 is mounted detachably to the outer wall 8.

The obstruction light 7 further comprises a seal 26 configured to seal the through-hole 11 of the outer wall 8 against the housing 16. The seal 26 comprises a first portion 27 arranged between an inner surface 28 of the through-hole 11 and an outer surface 29 of the cylindrical portion 17 of the housing 16, and a second portion 30 arranged between the inner surface 10 of the outer wall 8 and flange portion 18 of the housing 16.

Figure 3:
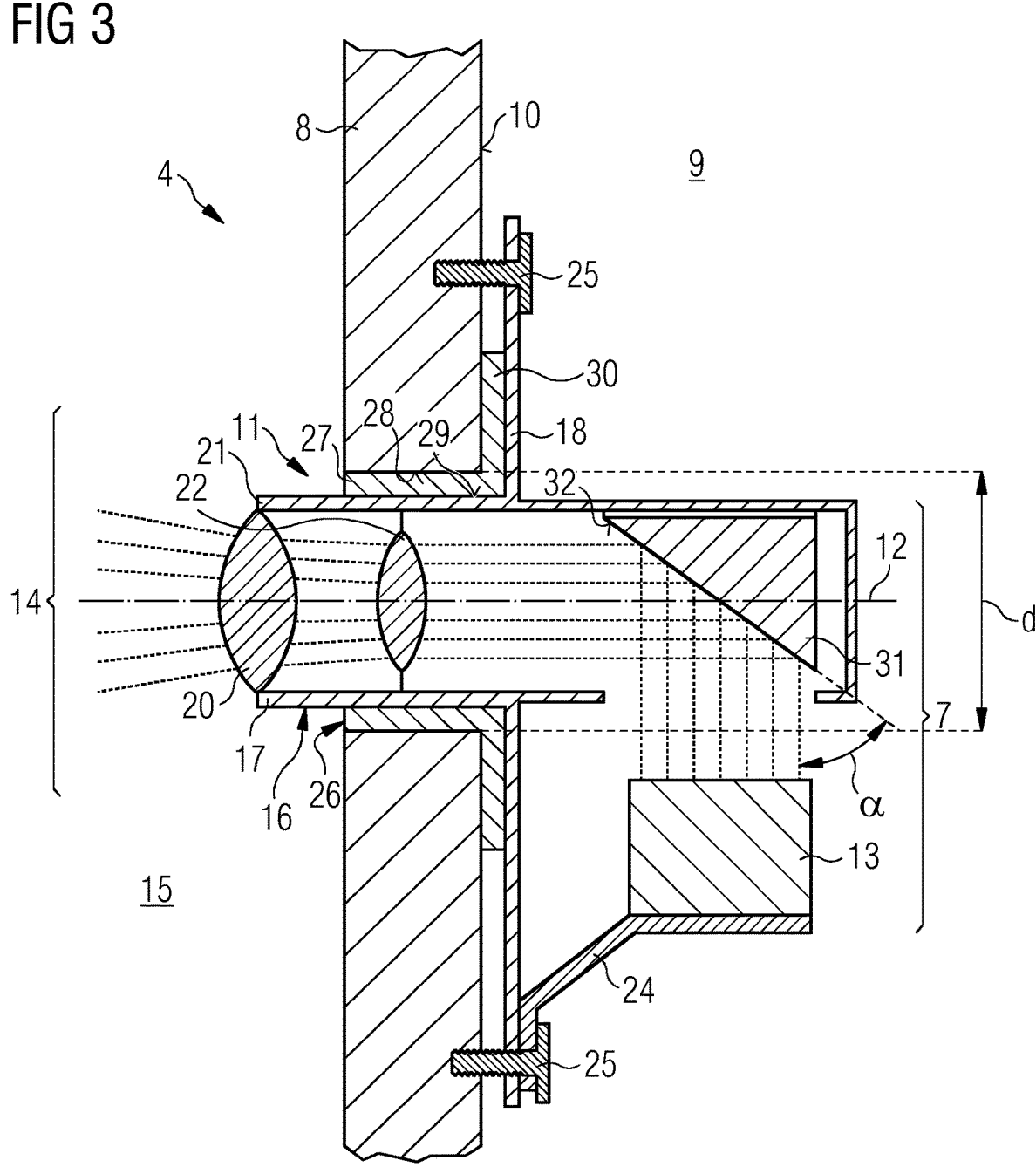
FIG. 3 shows, in a cross-sectional view II-II from FIG. 1, a second embodiment.

FIG. 3 shows the cross-sectional view II-II from FIG. 1.

In contrast to FIG. 2, the obstruction light 7 comprises a mirror 31 arranged inside the inner space 9. Further, the mirror 31 may be arranged inside and connected to the housing 16. Alternatively, the mirror 31 may be arranged outside the housing 16 and connected to the outer wall 8 of the tower 4. The light source 13 is configured to emit light 14 towards the mirror 31. Further, the mirror 31 is configured to reflect the light 14 through the through-hole 11 into the environment 15. Furthermore, the mirror 31 reflects incident light at an angle α relative to a reflective mirror surface 32. The angle α equals, e.g., 45°. The angle α also may measure between 10 and 80°, 20 and 70°, 30 and 60° or 40 and 50°. Further, the mirror surface 32 may have a concave or convex shape. The light source 13 is, for example, arranged beneath the through-hole 11. Alternatively, the strut 24 may be connected to the inner surface 10 of the outer wall 8. Thus, the light source 13 can be mounted separate from the housing 16. It is understood that the light source 13 comprises a casing for safety purposes.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A tower for a wind turbine, comprising:
   an outer wall encompassing an inner space and including a through-hole having a central axis;
   a housing comprised of a cylindrical portion and a flange, the cylindrical portion arranged at least partially inside the through-hole and the flange vertically extending from the cylindrical portion within the inner space;
   a seal configured to seal the through-hole of the outer wall with the housing, the seal comprising a first portion arranged between an inner surface of the through-hole and an outer surface of the cylindrical portion of the housing; and
   a light source operably attached to the flange and configured to emit light through the housing into an environment surrounding the tower;
   a first lens disposed at an outer end of the housing and configured to modify the light on a path into the environment; a second lens disposed within the housing, wherein the second lens is smaller than the first lens;
   a reflective tube disposed proximate the light source within the through-hole, the reflective tube converging toward the second lens;
   wherein the light source lies on the central axis of the through-hole and is arranged inside the inner space of the outer wall.

2. The tower according to claim 1, wherein the housing supports the light source at an inner end of the housing.

3. The tower according to claim 1, wherein the first lens is configured to disperse the light.

4. The tower according to claim 1, wherein the second lens is arranged in the light path from the light source towards the first lens.

5. The tower according to claim 1, wherein the flange is connected to the cylindrical portion and extends radially along an inner surface of the outer wall.

6. The tower according to claim 5, further comprising at least one strut supporting the light source, the strut being attached to the flange portion and/or the inner surface of the outer wall and to the light source.

7. The tower according to claim 1, wherein the light source is mounted detachably to the housing.

8. A wind turbine comprising a tower according to claim 1.

9. The tower according to claim 1, wherein the light source is arranged entirely inside the inner space.

10. The tower according to claim 1, wherein the seal includes a second portion connected to the first portion, the second portion arranged against an inner surface of the outer wall.

11. The tower according to claim 10, wherein the second portion is arranged between the inner surface of the outer wall and the flange of the housing.

12. A tower for a wind turbine, comprising:
    an outer wall encompassing an inner space and having a through-hole;
    a mirror;
    a housing comprised of a cylindrical portion and a flange, the cylindrical portion arranged at least partially inside the through-hole and the flange vertically extending from the cylindrical portion within the inner space;
    a seal configured to seal the through-hole of the outer wall with the housing, the seal comprising a first portion arranged between an inner surface of the through-hole and an outer surface of the cylindrical portion of the housing; and
    a light source configured to emit light towards the mirror and arranged inside the inner space, the light source located entirely within the inner space;
    a first lens disposed at an outer end of the housing and configured to modify the light on a path into the environment;
    a second lens disposed within the housing, wherein the second lens is smaller than the first lens;
    wherein the mirror is configured to reflect the light through the through-hole into the environment.

13. The tower according to claim 12, wherein the light source is arranged inside the inner space at a vertical distance from the through-hole.

14. The tower according to claim 12, wherein the light source is configured to emit light indirectly through the through-hole.

15. The tower according to claim 12, wherein the seal includes a second portion connected to the first portion, the second portion arranged against an inner surface of the outer wall.

16. The tower according to claim 15, wherein the second portion is arranged between the inner surface of the outer wall and the flange of the housing.

\* \* \* \* \*